United States Patent
Cobb et al.

(10) Patent No.: US 7,577,769 B2
(45) Date of Patent: Aug. 18, 2009

(54) UN-INSTALLATION OF INACTIVE OR REMOVED PERIPHERAL DEVICE DRIVERS

(75) Inventors: Jason T. Cobb, Sammamish, WA (US); James G. Cavalaris, Kirkland, WA (US); Santosh S. Jodh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 11/069,109

(22) Filed: Mar. 1, 2005

(65) Prior Publication Data

US 2006/0200594 A1 Sep. 7, 2006

(51) Int. Cl.
G06F 3/00 (2006.01)

(52) U.S. Cl. .......................... 710/18; 710/19
(58) Field of Classification Search ............ 710/18, 710/19
See application file for complete search history.

(56) References Cited

U.S. PATENT DOCUMENTS

| | | | | |
|---|---|---|---|---|
| 4,827,411 A | * | 5/1989 | Arrowood et al. | 707/206 |
| 5,652,613 A | * | 7/1997 | Lazarus et al. | 725/50 |
| 6,128,745 A | * | 10/2000 | Anderson et al. | 713/323 |
| 6,405,362 B1 | * | 6/2002 | Shih et al. | 717/174 |
| 6,557,033 B2 | * | 4/2003 | Maeda | 709/223 |
| 2002/0083431 A1 | * | 6/2002 | Machida | 717/174 |
| 2002/0170951 A1 | * | 11/2002 | Oshins et al. | 235/375 |
| 2004/0003135 A1 | * | 1/2004 | Moore | 709/321 |
| 2005/0257226 A1 | * | 11/2005 | Belvin et al. | 719/328 |

* cited by examiner

Primary Examiner—Henry W. H. Tsai
Assistant Examiner—Juanito C Borromeo
(74) Attorney, Agent, or Firm—Wolf, Greenfield & Sacks, P.C.

(57) ABSTRACT

The subject invention relates to systems and methods that automatically monitor computer platform components and initiate automated resource recovery procedures based on detected periods of component inactivity. In one aspect, an automated maintenance system for computer resources is provided. The system includes a controller that monitors installation and removal of system components that cooperate to facilitate various operations of a computer. A threshold component supplies time out or decay values for the devices to determine inactive periods of the devices, whereby the controller removes persistent memory references for the devices based in part on the time out values. Supervisory threshold functions can be provided to cause the system to perform maintenance operations at other desired intervals in order to allow periods of device inactivity while maintaining desired component information on the respective system.

10 Claims, 9 Drawing Sheets

UN-INSTALLATION OF INACTIVE OR REMOVED PERIPHERAL DEVICE DRIVERS

TECHNICAL FIELD

The subject invention relates generally to computer systems, and more particularly, relates to systems and methods that enable automated removal of inactive software components that are related to devices which are determined to be no longer present within a computerized platform.

BACKGROUND OF THE INVENTION

Operating system platforms have enabled the rapid growth of various technologies that are developed on such systems. Many of these platforms along with running many differing applications for developing the technologies also have become much easier to use when adding components such as hardware devices and associated drivers to the systems. For instance, in one area, some systems allow hardware or software components to be installed on the respective platforms, whereby these components in essence can be plugged into the system with a high degree of confidence that they will also cooperate with the system and other devices/components that have been previously installed. One common name for such technology is referred to as Plug and Play technology which enables devices or components to be easily integrated within an existing system.

Plug and Play technology generally relates to when a computer system automatically recognizes new devices and determines what driver software, resource settings, and so forth the device needs with very little or no interaction from the user. This technology also will typically only load a driver if it is needed since the hardware is currently detected as present. In less sophisticated systems, drivers may always be loaded as a matter of system policy since these systems cannot detect if the hardware is present or not. However, one of the issues with Plug and Play having the ability to detect hardware is that the technology may sometimes store large amounts of data regarding any hardware that has ever been associated with the computer platform, even if that hardware is not currently present. Since all computing devices generally have resource constraints within the platform, the associated Plug and Play data can eventually grow so large that it causes the computer to fail or perform poorly.

In some cases, when hardware is added to an existing platform, the Plug and Play system creates persistent data structures in fixed storage (the registry) that remembers various information and settings for the installed piece of hardware. In addition, more properties and references can be added to these data structures when the Plug and Play system installs a driver to cause the device to operate in the system. A driver is a software component that resides in between the operating system and the hardware and allows the operating system to communicate with the hardware. Thus, when the hardware is removed from the computer without being uninstalled, the Plug and Play system generally will keep these data structures for the respective hardware in fixed storage. Generally, the data structures do not get removed unless a user manually cleans up this data which can be difficult task for even sophisticated users.

It is noted that the act of "removing" a device implies that the computer no longer recognizes the hardware as being present. Thus, removal can have different meanings for different devices. For example, removal for a Universal Serial Bus (USB) implies that the device was unplugged, whereas for a wireless device, removal can imply the device was taken out of range of the computer. Therefore, one reason data structures may be kept in storage is in case the user adds a particular piece of hardware back into their platform in the future. In this manner, the resultant storage of the data structures facilitates that previous settings are not lost and that the user will not have to reinstall the driver to cause proper hardware operations at some point in the future.

One current problem with storing data structures for drivers is that since these data structures may not be removed, they can accumulate over time. There have been cases on larger server machines for example, where these data structures, for hardware that is no longer present, have taken up so much memory that the machines may no longer boot up. In addition, the more data structures that are provided may cause hardware performance to suffer on device specific programming operations.

Removing the device-related data structures at some future point can be important for many reasons. In one case, precious space in the system hive or memory structure is conserved. If the system hive grows too large, for example, then the machine may not boot, or new devices may not be able to be added to the machine. Additionally removing the data structures may also lead to performance improvements in some device operations. Moreover, there are many driver references (e.g., function, class filter, device filter, and so forth) that can be stored with Plug and Play data. By removing unused data, these associated references can also be freed. This can indicate that the drivers and the applications that installed the drivers can be removed since they would no longer be needed.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods that automatically detect when non-functional components have been removed from a computer system and subsequently performing system clean-up operations based upon the detection. In one aspect, a system monitor and/or controller tracks activities of various devices or components that are residing on a system. The controller acts in concert with an operating system, for example, and determines whether or not devices or components that have been installed previously on the system (or associated therewith in the case of wireless devices) are presently active. If it is determined that a device is no longer active within the system (e.g., within a designated threshold), removal components can be invoked to automatically remove persistent memory references or persistent data structures relating to the inactive devices from the system. For instance, if it is determined that a respective device is inactive, the controller can automatically initiate an uninstall procedure to remove references from the system registry or references to other data structures in memory that are no longer needed for the device in view of the detected inactivity.

As systems grow and change overtime due to differing needs, the subject invention provides for automated maintenance procedures to occur that removes unnecessary components from the system while preserving desired system functionality. This mitigates users from having to perform complex software removal or maintenance procedures while increasing system reliability by automatically detecting and removing components that could operate as a drain to limited system resources such as memory. In one example, decay timeout values or thresholds associated with a given device, are monitored in view of decay counts that are incremented (or decremented) over time after a detected period of device inactivity. If a count value is incremented above a selected threshold before a device becomes active, the system can invoke an automated procedure to remove memory instances of the inactive device. In order to allow for certain periods of inactivity, a decay timestamp can be provided that offers a desired amount of digital filtering to be applied before allowing determinations to be made regarding a device's actual inactivity. In this manner, temporary removals can be accounted for without inadvertently removing a still yet active system data structure.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods that automatically monitor computer platform components and initiate automated resource recovery procedures based on detected periods of component inactivity. In one aspect, an automated maintenance system for computer resources is provided. The system includes a controller that monitors installation and removal of system components such as peripheral or bus devices that cooperate to facilitate various operations of a computer. The controller can operate in conjunction with an operating system or platform in the normal operations of the computer. A threshold component supplies time out or decay values for the devices to determine inactive periods of the devices, whereby the controller removes memory references for the devices based in part on the time out values (e.g., a device is detected as being inactive longer than the decay value). Supervisory threshold functions can be provided to cause the system to perform maintenance operations at other desired intervals in order to allow periods of device inactivity while maintaining desired component information on the respective system.

As used in this application, the terms "component," "system," "object," "threshold," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
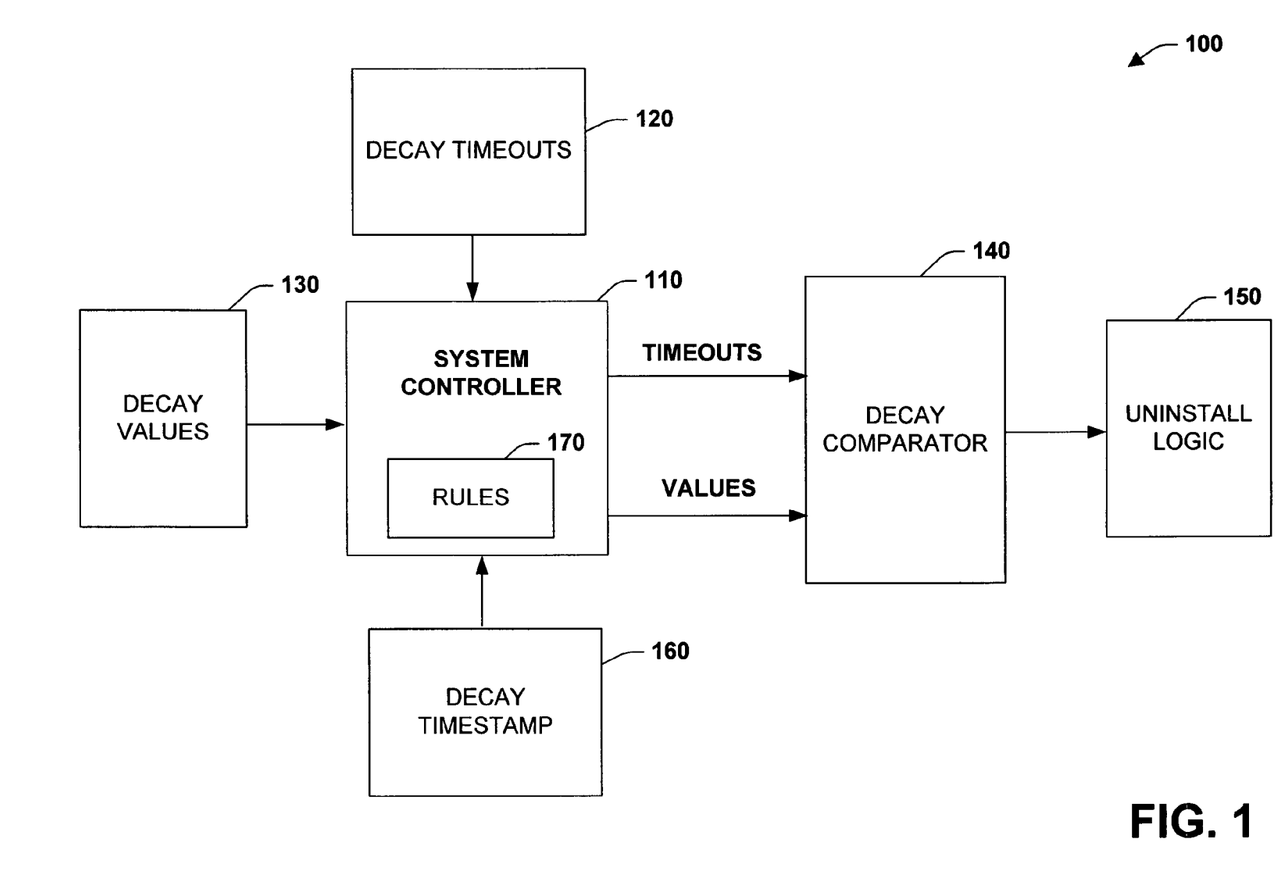
FIG. 1 is a schematic block diagram illustrating an automated resource recovery system in accordance with an aspect of the subject invention.

Referring initially to FIG. 1, an automated resource recovery system 100 is illustrated in accordance with an aspect of the subject invention. The system 100 includes a system controller 110 that employs one or more decay timeout values 120 (also referred to as timeouts) which are utilized to determine whether or not system resources of a component should be removed or reclaimed from the system. In general, the controller 110 reads a decay value 130 or count that represents how long a given component has been missing or inactive within the system 100. Thus, each component in the system 100 such as a device driver (not shown) can be assigned a decay timeout 120 which operates as a threshold value for determining whether or not to remove resources such as unused data structures from the system.

In one case, the controller 110 (e.g., Plug and Play Manager) reads the delay timeout 120 assigned to a respective device along with an associated decay value 130 for the device. These values are passed to a decay comparator 140 which determines if the decay value 130 exceeds the decay timeout 120 (e.g., subtraction of the decay value from the threshold). If the threshold is exceeded, a flag can be set by the comparator 140 to automatically invoke uninstall logic 150 (e.g., calling existing system uninstall procedures which are automatically invoked by the controller) which removes persistent resources associated with the device from the system 100. For instance, a sound device may be assigned a decay timeout value 120 having the value of 10 (e.g., 10 days, 10 hours, 10 minutes, and so forth). As the controller 110 operates, it would inspect the sound device for periods of activity. If no activity were detected during a current inspection, the decay value 130 can be incremented. Overtime, if the decay value 130 is incremented over a value dictated by the decay timeout 120, system resources associated with the sound device can be removed (e.g., reclaiming registry storage for use by another system device).

As can be appreciated, the controller 110 can monitor both hardware and software components for detected periods of activity and subsequently remove or reassign resources relating thereto. Also, the decay values 130 can be incremented or decremented depending on the desired implementation (e.g., decrement a counter down to a removal threshold or increment counter up to a removal threshold). As will be described in more detail below, a delay timestamp 160 can be employed to cause the system to run the automated removal procedures described herein at predetermined intervals (e.g., only compare decay values to timestamps every 2 days).

It is noted that there can be one or more other rules 170 for determining if data for a non-present piece of hardware (or software) should be deleted or not. For instance, one rule could relate to a maximum limit of all the potential hardware data verses its current size. Alternatively, if the total number of non-present devices surpasses a certain limit then the devices marked for decay can be removed. Other rules 170 can relate to differing classes or hierarchies for devices where one class can have a first rule set applied and another class can have a different rule or rules 160 applied (e.g., all device drivers below a certain address range employ one decay timeout and drivers above the range employ a different timeout, or do not apply timeout considerations to this class of devices).

Figure 2:
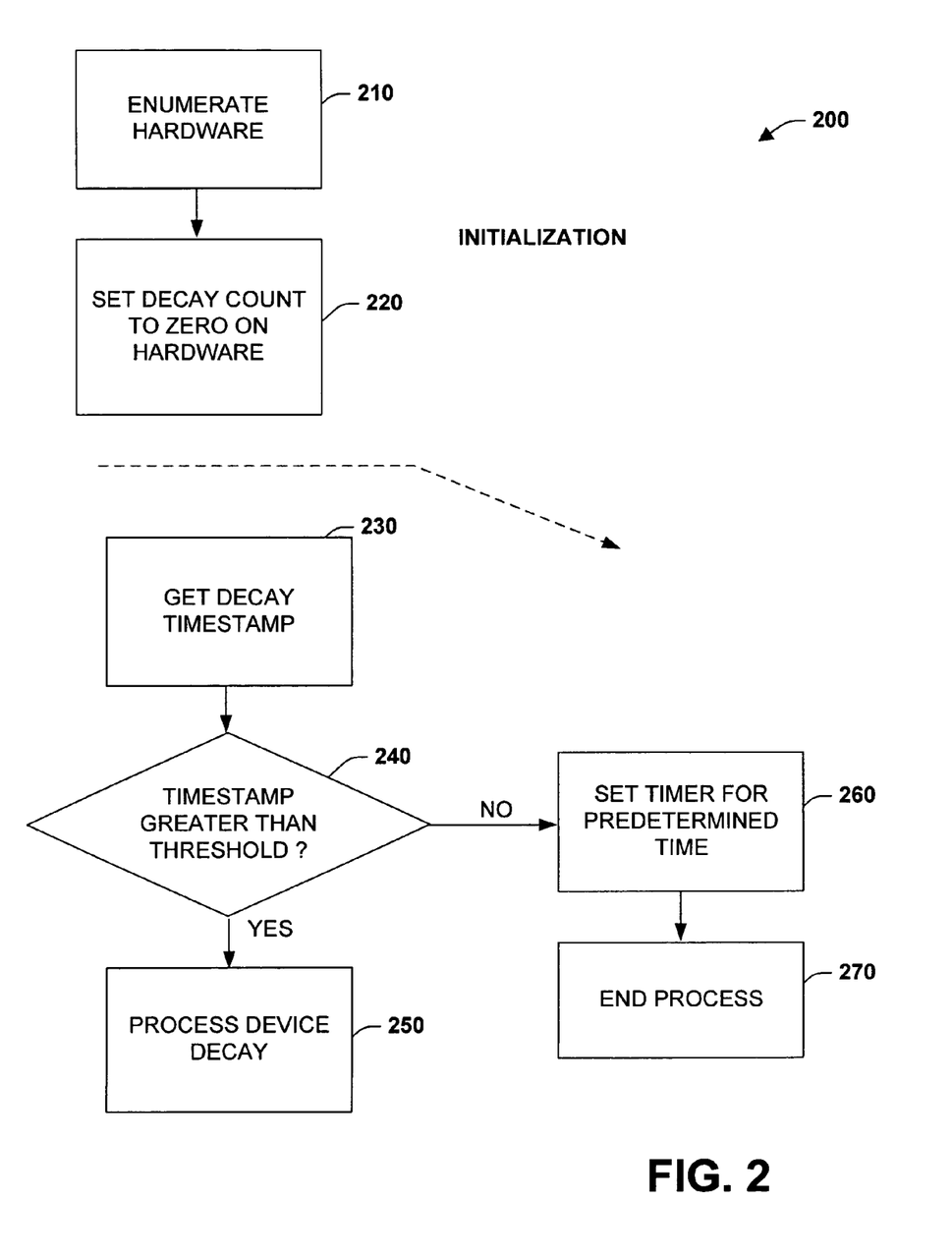
FIG. 2 is a flow diagram illustrating device decay initialization processing in accordance with an aspect of the subject invention.
Figure 3:
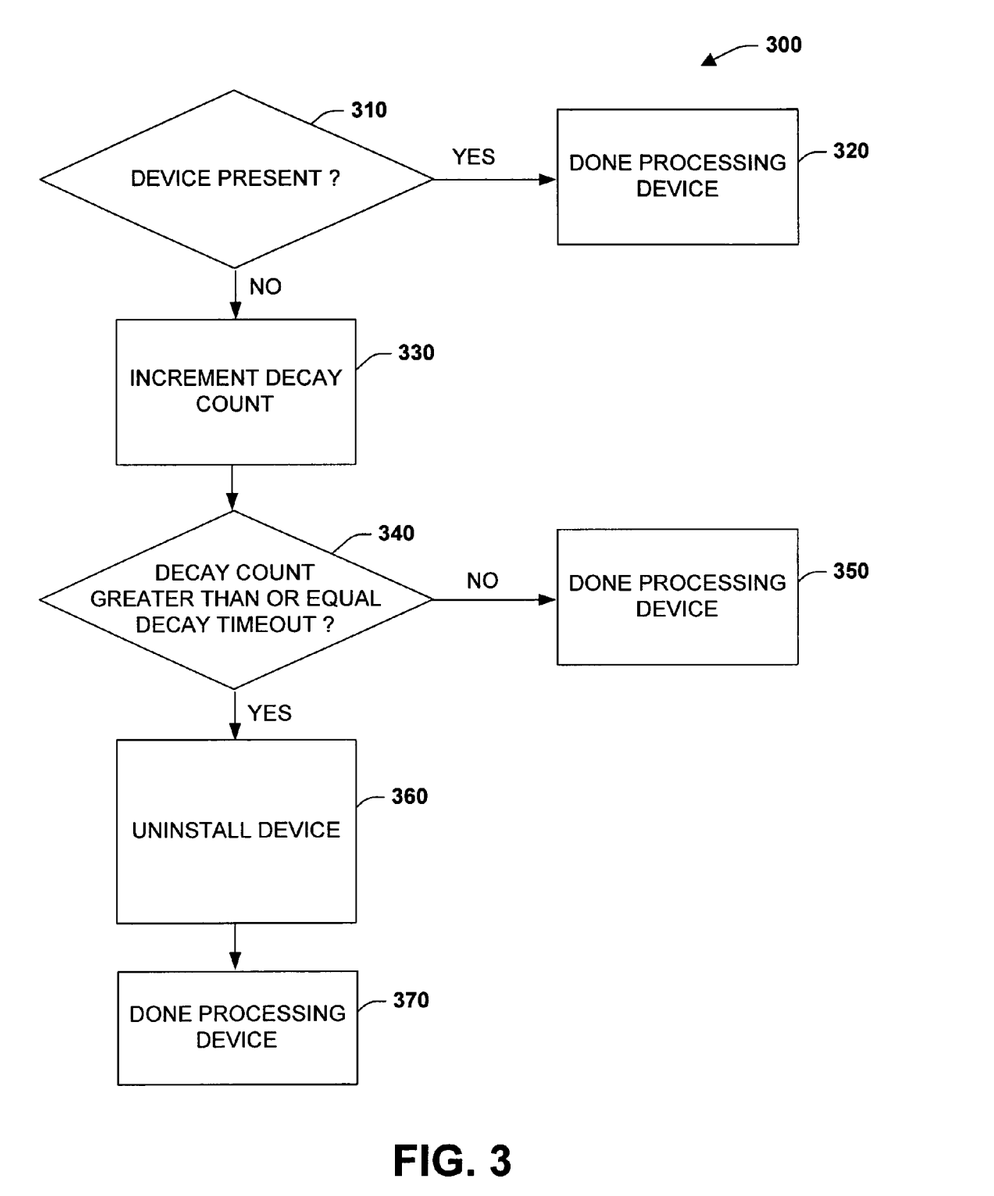
FIG. 3 is a flow diagram illustrating device decay processing in accordance with an aspect of the subject invention.

FIGS. 2 and 3 illustrate example processes for system clean-up operations in accordance with an aspect of the subject invention. While, for purposes of simplicity of explanation, the methodologies are shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring now to FIG. 2, an example process 200 illustrates device decay initialization processing in accordance with an aspect of the subject invention. In this aspect, system startup and initial processing aspects are considered as relating to how decay values are processed for a given device. Proceeding to 210, available system hardware is enumerated or determined and an initial decay count is set to zero for each device found or enumerated at 220. This count initialized at 220, can be subsequently incremented if no device activity is detected as described in FIG. 3.

After the initialization procedure is performed at 210 and 220, a controller or other component may operate a background thread beginning at 230 which reads a decay timestamp value for an enumerated device. At 240, if the timestamp is greater than a predetermined threshold (e.g., over 24 hours old), the process proceeds to 250 to begin device decay processing for a device whose timestamp has exceeded the threshold. Such processing is illustrated in more detail with respect to FIG. 3. If the timestamp value has not exceed the threshold at 240, a timer is set at 260 (e.g., set timer for 24 hours from current relative time value) and the process ends at 270.

Turning to FIG. 3, an example process 300 illustrates device decay processing in accordance with an aspect of the subject invention. Proceeding to 310, a first determination is made as to the presence or a device or component. If the device is present at 310, the process ends at 320. If the device is not present at 310, the process proceeds to 330 and increments a decay count for a given component or device. As noted above, decrementing procedures are also possible. At 340, a determination is made as to whether or not the decay count is greater than or equal to a decay timeout threshold. If not, the process ends at 350. If the threshold is exceeded, the process proceeds to 360 to automatically uninstall resources for the inactive component before ending at 370. As can be appreciated, the processes depicted in FIGS. 2 and 3 can be executed overtime such as during background (or foreground) operations associated with an operating system.

In general the processes depicted in FIGS. 2 and 3 can be operated separately for a plurality of components during reoccurring processes. Thus, every device (present and not-present) can have a property called decay count. This property can be the number of days or other timeframe that a device has not been present on a computer system. Additionally every device can have a property called decay timeout that specifies the number of days that a piece of hardware (or software) can be missing from a computer system before the controller such as a Plug and Play manager uninstalls the hardware or other component. The uninstall action can thus free up data structures for that hardware as well as any other data or reference counts.

The decay check timestamp described above can be employed by system components such as a Plug and Play manager. For example, this timestamp can be used and updated by the Plug and Play manager to facilitate that it only checks for missing devices every 24 hours (or other period of time desired). Continuing with this example, when a piece of hardware is enumerated by the Plug and Play manager, the Plug and Play manager can set the decay count property for this hardware to 0 (or other arbitrary baseline value). This signifies that the hardware is currently present on the machine.

When the Plug and Play manager starts up (during system boot), it can perform a device decay check on all devices, if desired. Generally, the manager checks the decay check timestamp to make sure that it has been 24 hours since this check was last performed. If 24 hours has not elapsed, then the Plug and Play manager will not perform the device decay check. Instead it can set a timer to fire in 24 hours minus the delta between the current time and the device decay check. In essence this creates a timer that will fire in 24 hours from the device decay check timestamp.

If there has not been a device decay check in 24 hours, or after the timer has fired signaling the Plug and Play manager to perform the device decay check, the Plug and Play manager can then perform this action. It can enumerate though every piece of hardware on the computer system. For any hardware that is not present (missing) on the computer system, it can update that device's decay count by one (or other arbitrary count). It will then check to see if the device's decay count is greater than its decay timeout. If the decay count is not greater, the Plug and Play manager checks the next piece of hardware on the computer system. However, if the decay count is greater than the decay timeout for this hardware, the Plug and Play manager can have the option of uninstalling the associated hardware data (or software component data). When the Plug and Play manager has finished enumerating though the hardware or other components it can then update the decay check timestamp to the current time.

FIGS. 4-7 illustrate some example implementation aspects according to the subject invention. These Figures describe details relating to a Plug and Play implementation but it should be appreciated that other implementations are possible such as a background component in any computer system that routinely checks if related peripherals are active, and subsequently removes memory resources or data structures upon detecting that the peripheral is no longer active. In general, these implementations can have a kernel mode Plug and Play time stamp a device instance whenever the device is started or at least once a day (or other time frame) if the driver is running for over a day. The implementations can also determine valid decay times for different bus types. For instance Bluetooth may have a quicker decay then a USB device and so forth. Also, code can be added to the respective user mode Plug and Play manager to scan all phantom devices (e.g., non-present devices) once a day and uninstall any devices that are past their decay date.

In one specific example application, a user may buy a new printer and add it to their existing system. Thus, they may simply unplug the old printer and plug in the new printer. At some point in the future, the automated processes described above automatically clean up any Plug and Play data associated with the old printer. This will cause references to the driver store, driver files, and associated applications to be dropped, wherein the resources can be subsequently employed for other purposes. This reference drop also implies that the affected components can now perform their own cleanup since they are no longer being used by a device.

Figure 4:
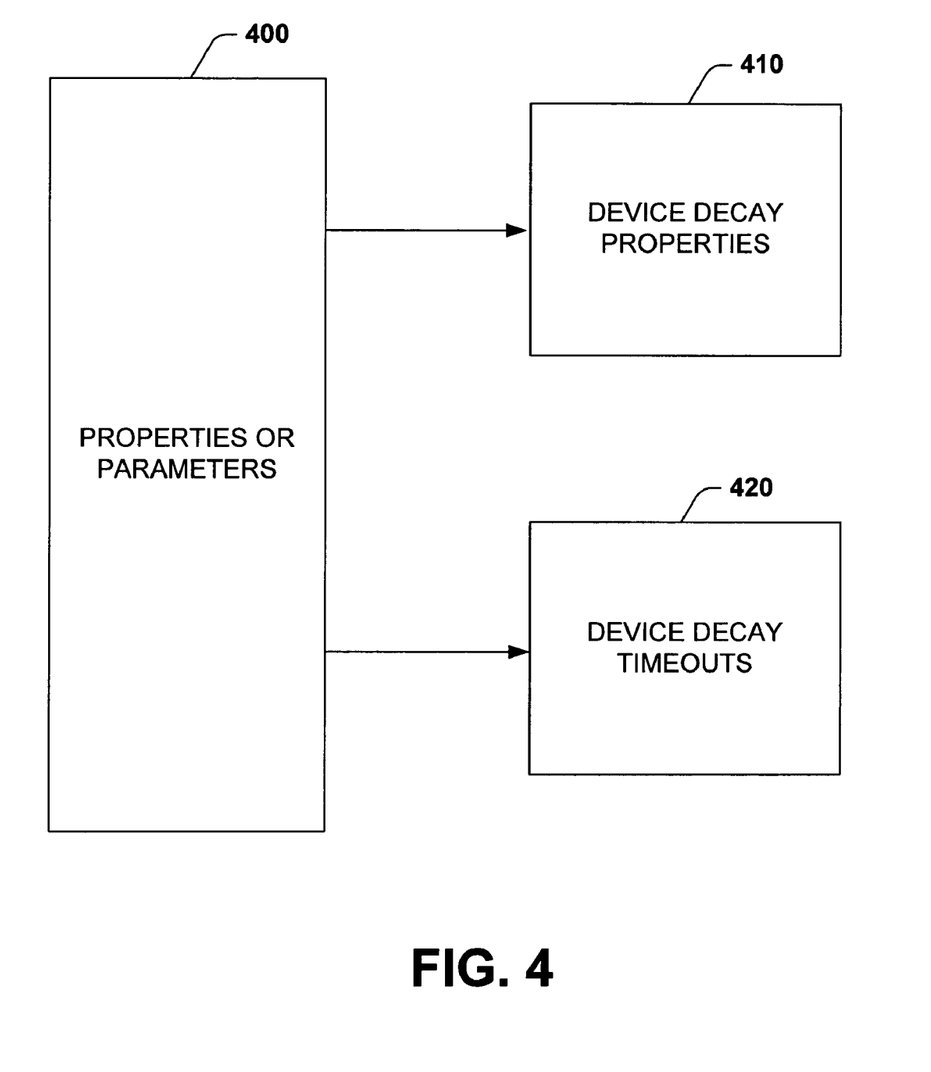
FIG. 4 illustrates example configuration properties in accordance with an aspect of the subject invention.

FIG. 4 illustrates example configuration properties 400 for decay processing in accordance with an aspect of the subject invention. In this case, various properties or parameters 400 can be configured in order to determine respective points for removal events to occur in accordance with the subject invention. At 410, one or more device decay properties can be configured (e.g., via system defaults, wizards, or user interface). The device decay property 410 is the property that controls a device's decay as noted above and can vary from device to device. This property can be a DWORD, for example, and should be set and read by a Local System component or kernel mode. This property is the count of days that a device has been a phantom (not live or active). At 420, a Device Decay Time Out property can be configured. This property is the count of days that the respective device can be a phantom (i.e., not active) before it can be automatically uninstalled. There can be default values based on bus type if this value 420 is not present. This value can be set by an INF, class or co-installer during device installation, or programmatically after device installation. If this value 420 is set to 0, then the device will be uninstalled the next time that the user mode Plug and Play manager checks for decayed devices which should be sometime in the next 24 hours (or other configurable timeframe).

Figure 5:
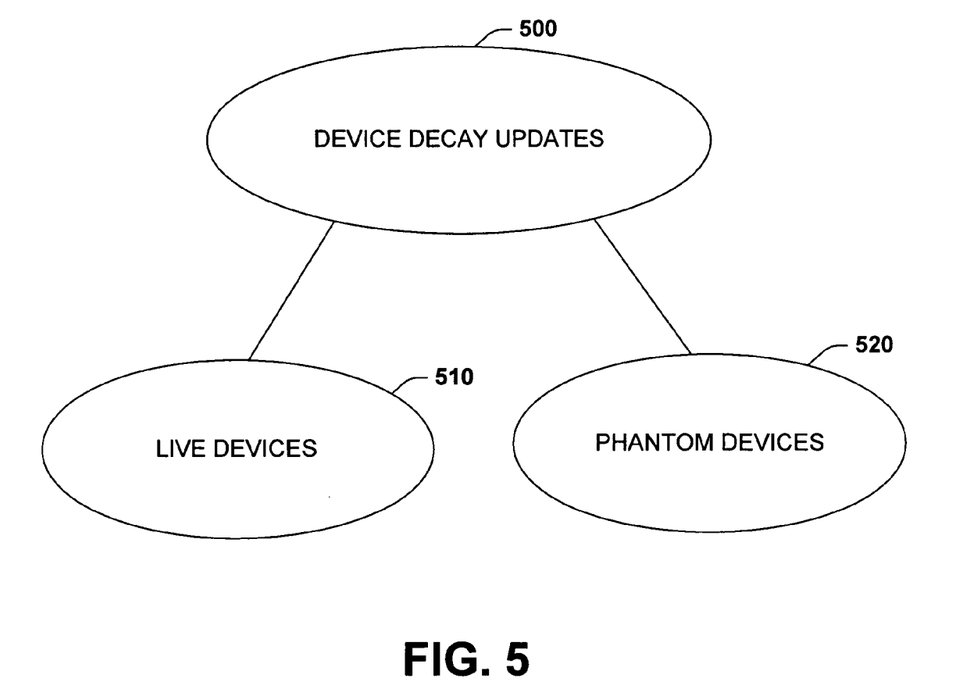
FIG. 5 illustrates an example device decay updates for different classes of devices in accordance with an aspect of the subject invention.

FIG. 5 illustrates example device decay updates considerations 500 for different classes of devices in accordance with an aspect of the subject invention. At 510, device enumeration is considered for live or active devices. In this case, when a kernel mode Plug and Play enumerates a device it can set the Device Decay property described above to 0 indicating that the device is live and therefore its decay count should be reset to 0. As can be appreciated, 0 is merely a baseline reference count and that other count values can be employed. At 520, phantom devices are considered that relate to devices that are not live or detected as inactive. When a Plug and Play service starts, the service can make a pass though all of the devices updating the decay count of any phantoms it finds and automatically uninstalling any devices that have passed their decay timeout. Generally, for efficiency, the Plug and Play service should make one pass per day or other predetermined time that allows a respective system to stabilize. To achieve this, the Plug and Play service can set a FILETIME value under its service key when it is finished making one of these passes. When the service is about to make another pass, it can check the timestamp value to determine if 24 hours have elapsed, and if not then it can skip the pass.

One reason for the timestamp logic is that many users reboot their machines numerous times in one day and thus there is no reason for the Plug and Play service to check the decay count more than once in a given day. Additionally other users leave their machine running for days on end. To deal with this second case, the Plug and Play service can set a timer that fires once a day. When this timer fires, the Plug and Play service can make another pass though all the devices, incrementing the decay count of any phantoms that it detects. Again, when it has finished with the current pass, the Plug and Play service can create another timer that can fire in another 24 hours. During one of these passes, the Plug and Play service can increment the Device Decay property on the phantom devices that are detected.

Figure 6:
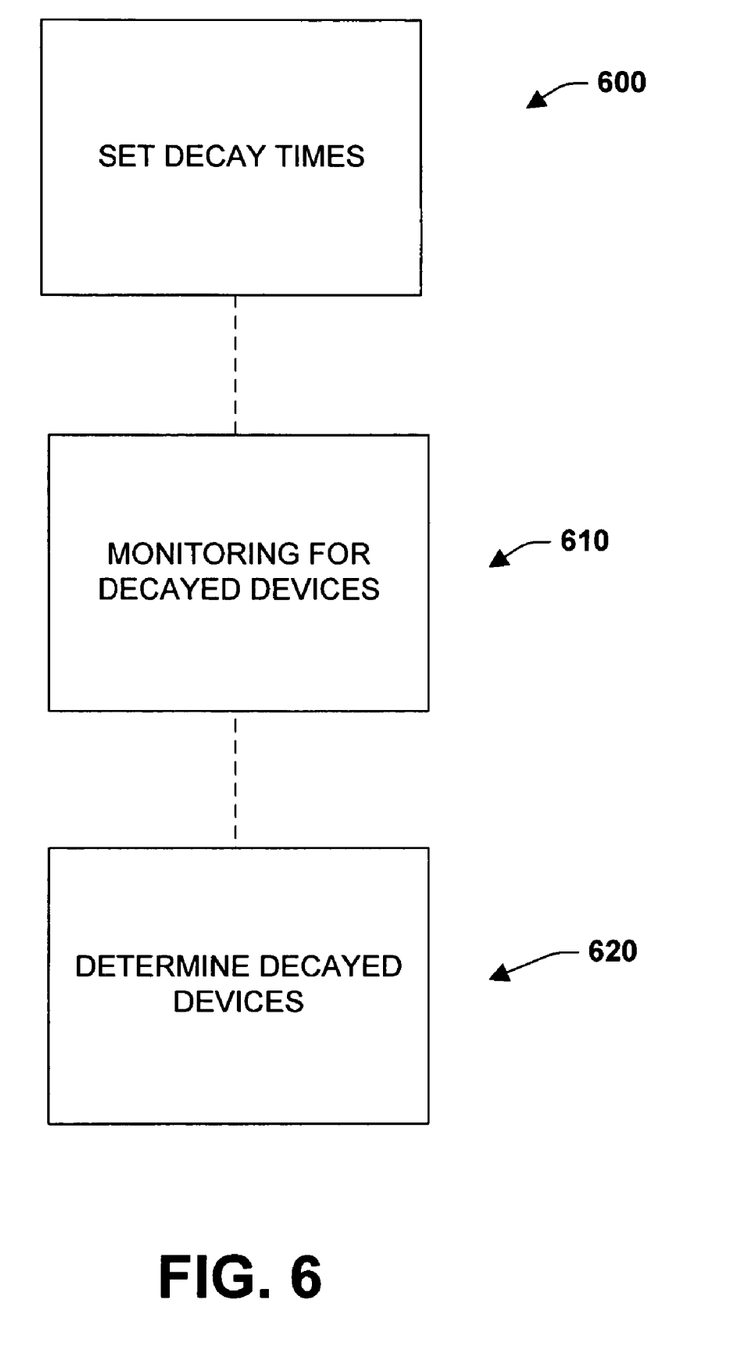
FIG. 6 illustrates example device determinations in accordance with an aspect of the subject invention.

FIG. 6 illustrates example device determinations in accordance with an aspect of the subject invention. In this example, various threads can be executed and are illustrated at 600 through 620. At 600, decay times can be set by default for a given device based on its bus type. Also, this decay value can be set during a device's install by the INF, class or co-installers, or later programmatically via a user interface, if desired. As one of its first operations after it starts, the Plug and Play service described above can spawn a separate thread that first updates all of the Device Decay values for the phantom devices, for example. After the initial operation, the Plug and Play service can then monitor every phantom at 610 to determine if its Device Decay value is greater then the decay time allowed for a device of this type at 620. If so, then the service can perform an uninstall of this device (and related resources) as described in more detail with respect to FIG. 7. After the Plug and Play service has performed the uninstall operation or monitoring operation at 610, it can set a timer that fires in 24 hours. When this timer fires, the user mode Plug and Play service updates the device's Device Decay values and monitors for any new devices that have passed their allowed decay time.

Figure 7:
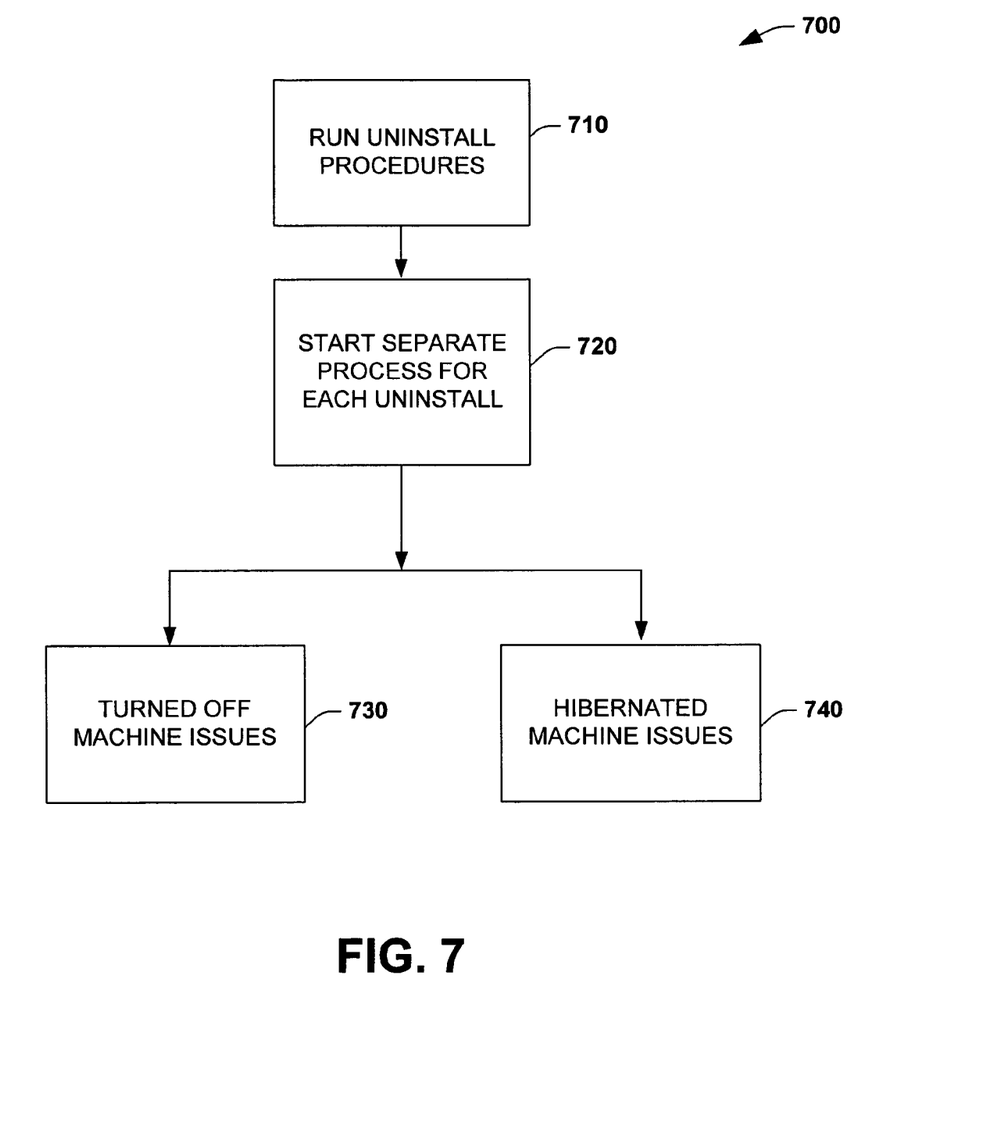
FIG. 7 is a flow chart illustrating example device uninstall processes in accordance with an aspect of the subject invention.

FIG. 7 illustrates an example device uninstall process 700 in accordance with an aspect of the subject invention. At 710, a generalized uninstall procedure can be initiated for all devices in a system, wherein uninstall operations for all detected phantom devices are commenced. Alternatively, at 720, a separate thread or process can be started for each respective device to be uninstalled. To uninstall Plug and Play (PnP) or other type data for a given decayed device, a Setup Call Class Installer can be called with a DIF_REMOVE flag set for the device. A QUIET INSTALL flag can also be set to inform a class installer that they should not show any user interfaces for the uninstall due to the automated procedures being invoked. Generally, every individual device is uninstalled in its own process as illustrated at 720 wherein a main Plug and Play service process monitors the individual uninstall processes or threads. If one of these uninstall processes take too long, then the main Plug and Play service process can terminate the uninstall process and set a new Configuration Flag on the device indicating that the system should not attempt to uninstall it in the future because some class or co-installer is performing an operation that is hanging the installation or uninstall.

It is noted that by default there is no generally user interaction in the respective uninstall process for a detected inactive component. This provides flexibility of performing this operation on computers where a non-administrator is logged on as well. If desired, a policy could be employed where a user is prompted before performing an uninstall of any device, if desired. Proceeding to 730 and 740, some considerations are given to uninstall operations depending on whether or not a machine has been turned off for a period of time or whether some other circumstance such as a low power or hibernate mode were entered for an extended period. At 730, if a machine has not been booted for many days, weeks, or months, for example, then the Device Decay time may not accurately reflect the number of days that the device has been removed from the machine. Thus, one course of action is to count the number of days that a machine has been booted in order to mitigate reinstalling removed drivers. At 740, if a machine has been hibernated for many days, this situation can be treated similarly as the machine being powered down situation of 730 and thus, basically only count days that the machine has been active.

Figure 8:
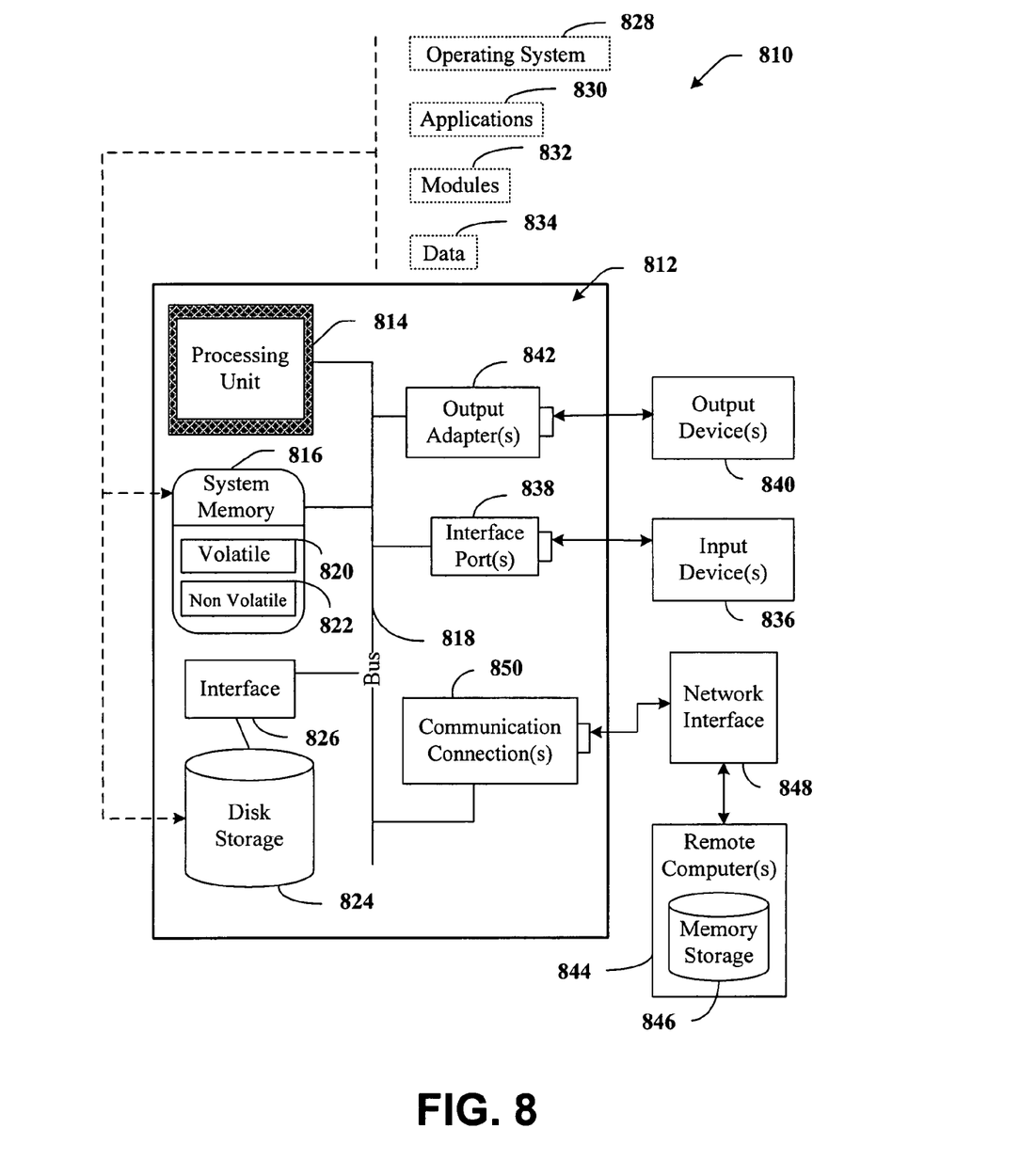
FIG. 8 is a schematic block diagram illustrating a suitable operating environment in accordance with an aspect of the subject invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
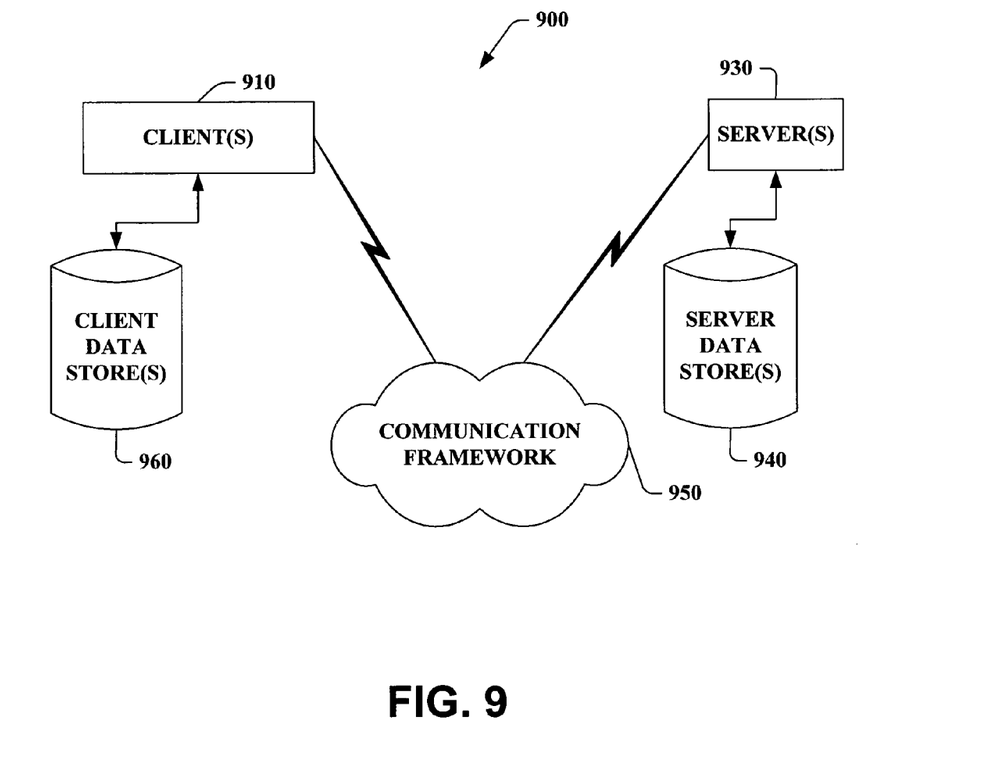
FIG. 9 is a schematic block diagram of a sample-computing environment with which the subject invention can interact.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the subject invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automated computer implemented maintenance system stored in a tangible computer readable storage medium for computer resources, comprising:
    a controller that monitors installation and removal of one or more devices that cooperate to facilitate operations of a computer;
    a threshold component that supplies time out values for the devices to determine inactive periods of the devices, the controller removes persistent memory references from a system registry for at least one of the devices based at least in part on the time out values;
    an initialization and monitoring component to enumerate device objects, wherein the initialization and monitoring component is a Plug and Play (PnP) manager for a USB port; and
    a rules component that permits selective unistallation of at least one of the devices based on one or more rules that set the time out values for the devices depending on a classification of the devices based at least on a bus type of the devices; and
    a comparator function that compares the time out values of the devices with respective decay values to determine if automated procedures related to one or more un-installation procedures that remove references of a component's resources in persistent storage are to be invoked, wherein the decay values indicate respective periods of inactivity of the devices and the un-installation procedures reside as standard software removal procedures that are automatically invoked by the maintenance system.

2. The system of claim 1, the rules component includes rules relating to a maximum limit of potential hardware in view of a determined resource size.

3. The system of claim 1, the rules component includes rules relating to removing marked items based upon a predetermined number of non-present devices.

4. The system of claim 1, the PnP manager operates as a kernel mode or a user mode.

5. The system of claim 1, further comprising a user interface to initialize one or more properties that determine resource removal.

6. The system of claim 1, the controller removes memory references as part of a separate thread of execution per device.

7. A method for reclaiming inactive computer resources, comprising:
    enumerating one or more devices installed on a computer system;
    setting a threshold value for each device installed on the system;
    associating an activity value for each device;
    incrementing the activity value for at least one non-responding device;
    automatically comparing the threshold value and the activity value during a computer background operation;
    automatically running an uninstall procedure for the non-responding device based in part on the activity value and one or more rule sets applied to the device uninstall procedure based upon a classification of the device; and
    automatically removing memory references from a system registry based in part on decay values set in accordance with a classification scheme for the devices depending on a bus type of the devices wherein the decay values specify a number of days each of the devices can be inactive before running the uninstall procedure for the non-responding device.

8. The method of claim 7, further comprising automatically invoking the background operations in accordance with predetermined intervals.

9. The method of claim 7, further comprising configuring one or more decay properties for a device or a subset of devices.

10. A system to facilitate computer maintenance operations, comprising:
    tangible storage means for reading a threshold value for one or more devices installed on a system;
    tangible storage means for setting a decay value for each of the devices that specifies a count of days that a device can be inactive before it is automatically uninstalled;
    tangible storage means for changing the decay value upon detecting an inactive device; and
    tangible storage means for automatically removing memory references based in part on the decay value and a classification scheme for the inactive device wherein devices belonging to different classification schemes have different rules associated therewith for the automatic removal of memory references based on a bus type of each of the devices.

* * * * *